United States Patent [19]
Graves et al.

[11] Patent Number: 6,162,490
[45] Date of Patent: Dec. 19, 2000

[54] METHOD FOR APPLYING AN EMISSIVE MATERIAL TO A SUBSTRATE

[75] Inventors: Todd L. Graves, Garland; Wayne A. Sumner, Ogden, both of Utah

[73] Assignee: Iomega Corporation, Roy, Utah

[21] Appl. No.: 09/390,728

[22] Filed: Sep. 7, 1999

[51] Int. Cl.[7] .................................................. B05D 5/06
[52] U.S. Cl. .......................... 427/71; 427/64; 427/508; 427/510
[58] Field of Search .................................. 427/510, 508, 427/64, 66, 68, 71, 282; 101/123, 124, 126, 129

[56] References Cited

U.S. PATENT DOCUMENTS

| | | | |
|---|---|---|---|
| 4,549,484 | 10/1985 | Neese | 101/123 |
| 4,614,668 | 9/1986 | Topp et al. | 427/66 |
| 4,665,342 | 5/1987 | Topp et al. | 313/505 |
| 4,684,353 | 8/1987 | DeSouza | 445/51 |
| 4,743,801 | 5/1988 | Yokoyama et al. | 313/512 |
| 4,869,760 | 9/1989 | Matsunami | 156/151 |
| 5,260,163 | 11/1993 | Nebe et al. | 430/198 |
| 5,275,098 | 1/1994 | Larson | 101/123 |
| 5,699,733 | 12/1997 | Chang et al. | 101/129 |
| 5,893,325 | 4/1999 | Sakai | 101/123 |
| 5,906,158 | 5/1999 | Takai | 101/123 |

FOREIGN PATENT DOCUMENTS 357 443 A2  3/1990  European Pat. Off. .

*Primary Examiner*—Katherine A. Bareford
*Attorney, Agent, or Firm*—Woodcock Washburn Kurtz Mackiewicz & Norris LLP

[57] ABSTRACT

A system and method for applying a thick layer of luminescent emissive material, such as phosphor, to a substrate, such as a data storage cartridge, is provided whereby a luminescent emissive material is mixed with a binder, the mixture is dispensed onto a mesh screen placed over a substrate, and the mixture is then pushed through the mesh screen and applied to the substrate at a predetermined thickness. The predetermined thickness of the deposited phosphor layer is preferably between about 8 and 12 mils.

14 Claims, 2 Drawing Sheets

```
        Start
          ↓
Mix emissive material with a binder to form a mixture    20
          ↓
Dispense mixture onto a mesh screen                      22
          ↓
Push mixture through a mesh screen thereby               24
depositing the mixture onto a substrate
```

| 30 |
|----|
| 5  |
| 3  |

METHOD FOR APPLYING AN EMISSIVE MATERIAL TO A SUBSTRATE

FIELD OF INVENTION

The present invention relates generally to the application of an emissive material to a substrate, and more particularly, to systems and methods of depositing thick layers of latent illuminescent materials, such as phosphors or other emissive materials, to a substrate.

BACKGROUND OF INVENTION

A conventional method for applying material to the surface of a substrate is screen printing. Screen printing consists of forcing a type of material, in the form of a paste, through a mesh screen, parts of which have been blocked, thereby applying the paste to a substrate in a desired pattern. Screen printing allows a layer of material to be deposited onto a smooth substrate surface in a fast and economical fashion. One problem associated with screen printing methods is thickness control. At the present time, screen printing is not used to apply thick layers (in the range of between 8 to 12 mils) of emissive material, such as phosphor or other latent illuminance materials, to a substrate.

Current methods used for depositing emissive material onto a substrate include flexographic printing and pad printing. Flexographic printing involves applying a material, such as an ink, to a plate using a roller that is engraved with a pattern to determine the amount of ink to be delivered to a substrate. The plate then comes in contact with the material and transfers to the ink image onto the substrate. Pad printing involves etching depressions into a flat plate or printing block and then filling the plate or block with ink. The ink is picked up by a silicone pad, which transfers the ink to a substrate. However, such methods are limited to depositing a thin layer (about 2 mils or less) of emissive material onto substrate and are incapable of depositing a thicker layer (in the range of between 8 to 12 mils) of emissive material onto a substrate without producing spotty, inconsistent results.

Emissive material (also referred to herein as latent illuminance material) may be applied to an object such as a data storage cartridge as an identification/authentication tag or marker. After a tag containing the emissive material has been illuminated, it emits light having certain characteristics, such as spectral characteristics or decay time, that can be detected and analyzed to determine the identity/authenticity of the tag, and thus, the object attached to the tag. This technique is described in a co-pending application titled "Latent Illuminance Discrimination Marker For Data Storage Cartridges", Ser. No. 09/161,007, filed Sep. 25, 1998 commonly assigned, and incorporated herein by reference. The emissive material that is applied to a data storage cartridge desirably emits a significant amount of irradiance in order for the detector or reader in the drive to provide accurate detection results. To successfully achieve emission of a significant amount of irradiance, the emissive material is preferably applied in a thick layer (at least 8 to 12 mils) to the tag or directly on the object being identified. The current methods used to apply emissive material do not allow for the continuous, single pass application of such a thick layer of emissive material.

Moreover, the type of emissive material that is normally deposited onto a substrate is electro-luminescent material (i.e., a material that is electrically excitable). However, the type of emissive material that provides the desirably accurate detection results for the technique described above in co-pending application, Ser. No. 09/161,007, is a luminescent phosphor (i.e., a material that is excited by light), such as an aggregate particle phosphor. Luminescent phosphor has a larger particle size (between about 0.5 and 6 mils) than that of electro-luminescent material. The current methods used to apply luminescent material do not allow for the application of a layer of luminescent material with such a large particle size.

Accordingly, it is desirable to overcome the above listed limitations on the thickness and particle size of a layer of emissive material that can be applied to a substrate in a continuous, single pass manner.

SUMMARY OF INVENTION

The present invention is directed to systems and methods of applying a thick layer of emissive material to a smooth substrate, using a single pass, in a precise and consistent manner. The present invention allows for a layer of emissive material having a predetermined thickness to be deposited or applied onto the substrate. The emissive material application process involves mixing an emissive material with a binder to form a slurry or mixture, dispensing that mixture continuously onto a mesh screen placed over a substrate, and then pushing the mixture through the mesh screen in a single pass, thereby depositing the mixture onto the substrate at a predetermined thickness.

According to further aspects of the present invention, the emissive material is a phosphor with a particle size in the range between about 0.5 and 6.0 mils, and the emissive material is preferably applied to the substrate at a thickness of between about 8 and 12 mils.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to systems and methods of applying a thick layer of emissive material to a substrate.

Figure 1:
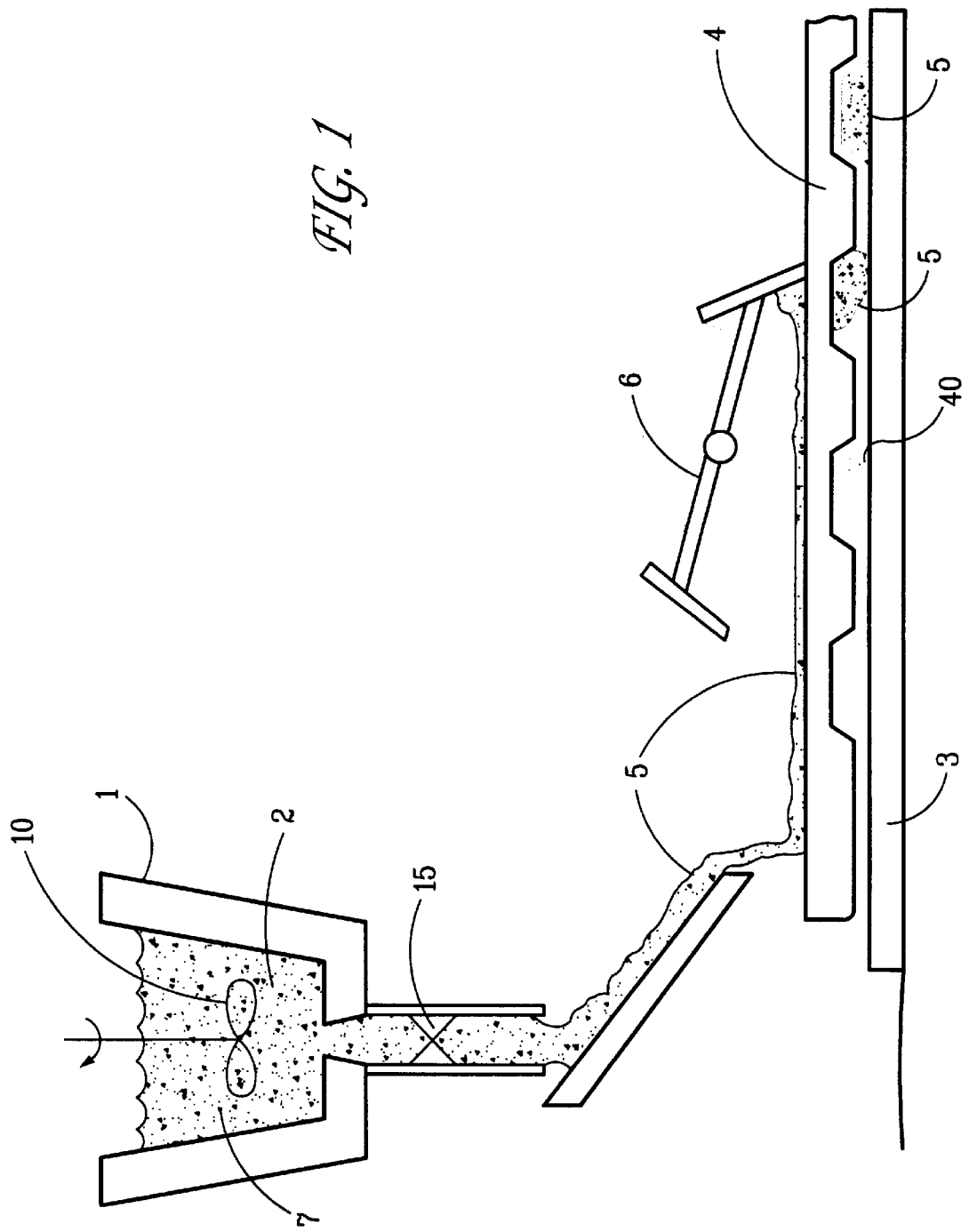
FIG. 1 shows a schematic side view illustrating the apparatus used for applying a thick layer of emissive material to a substrate in a single pass manner in accordance with the present invention.

FIG. 1 shows a schematic side view illustrating the apparatus used for applying a thick layer of emissive material to a substrate. An emissive material 7 and a binder 2 are disposed into a mixing bowl 1. The mixing bowl 1 has a blade 10 that is used to mix the emissive material 7 with the binder 2 to form a slurry or mixture 5. The mixture 5 is dispensed from the mixing bowl 1 onto a mesh screen 4 via a metering valve 15. The metering valve 15 provides a continuous flow rate of the mixture 5. The mesh screen 4 is placed over a substrate 3, with an off-contact distance 40 left to separate the mesh screen from the substrate. The mixture 5 is pushed through the mesh screen 4 using a squeegee 6 into the extra emulsion layer 42, where the mixture 5 is trapped and applied to the substrate 3 at a predetermined thickness. Exemplary screen printing systems can be used, such as those described in U.S. Pat. No. 5,893,325, issued to Sakai, and U.S. Pat. No. 5,906,158, issued to Takai, which are incorporated herein by reference.

In a preferred embodiment of the invention, the emissive material 7 comprises a luminescent phosphor, such as an aggregate particle phosphor. The binder 2 preferably comprises an ultra-violet curing ink carrier, although any conventional viscous carrier such as paint or ink can be used. The binder 2 is desirably viscous enough to hold the emissive material 7. The substrate 3 can be adhesive-backed that will be applied to an article to be authenticated or detected, such as a data storage cartridge, or can be the article itself. The substrate 3 can be either flexible or rigid. The mesh screen 4 is preferably a 100 mesh screen with 150 micron openings. The off-contact distance 40 is preferably in the range of between about 1.0 and 1.5 millimeters (about 40 to 60 mils). The mixture 5 is pushed through the mesh screen 4 by a squeegee 6 into the extra emulsion layer 42 where the mixture 5 is trapped and applied to the substrate 3 at a predetermined thickness, preferably in the range of between about 8 and 12 mils. It should be noted that the emissive material layer is deposited at the predetermined thickness, preferably between about 8 and 12 mils, using a single pass, in accordance with the present invention.

Figures 2, 3, 4:
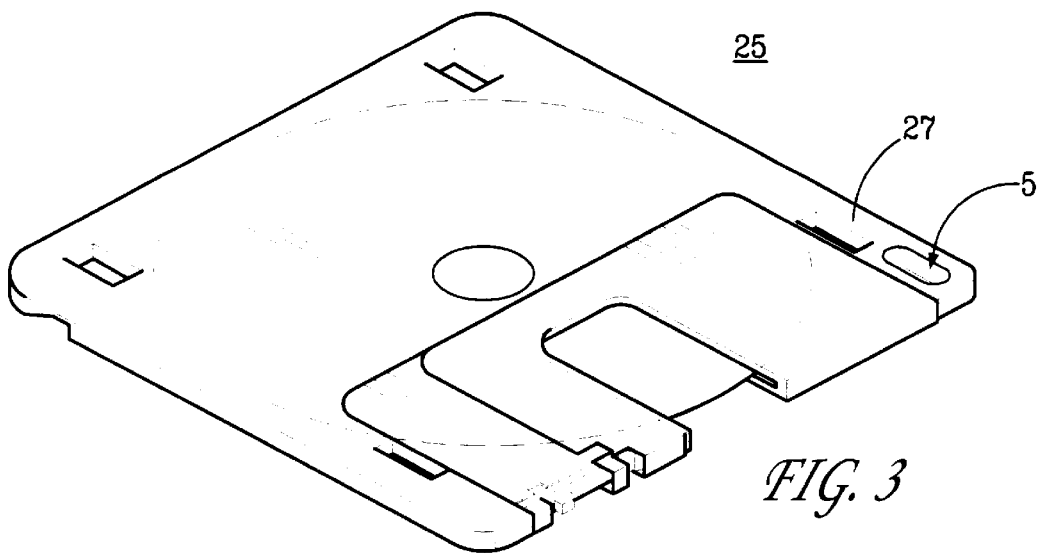
FIG. 2 shows a flowchart diagram of exemplary steps executed to apply a thick layer of emissive material to a substrate in accordance with the present invention.
FIG. 3 shows an exemplary substrate to which the thick layer of emissive material is applied by a method of the present invention.
FIG. 4 shows a cross-sectional view of a substrate to which the method described in the present invention is applicable.

FIG. 2 shows a flowchart diagram of exemplary steps executed to apply a thick layer of emissive material to a substrate in accordance with the present invention. At step 20, the emissive material 7 is mixed with a binder 2 to form an emissive material mixture 5. At step 22, the emissive material mixture 5 is continuously dispensed onto a mesh screen 4 placed over a substrate 3. At step 24, the emissive material mixture 5 is pushed through the mesh screen 4 thereby depositing the emissive material mixture 5 onto a substrate 3 at a predetermined thickness.

In a preferred embodiment, after the mixture 5 has been deposited on the substrate 3, it is cured by conventional means, such as being passed under a UV lamp (not shown). Several UV curing stations may be used to fully cure the ink due to the thick layer application.

In another embodiment of the invention, steps 22 and 24 are repeated several times in order to deposit several thick layers of mixture 5 (containing emissive material 7) onto the substrate 3 to obtain a thicker layer of emissive material 7.

In a further embodiment of the invention, steps 20–24 are repeated, with a different emissive material 7 being used each time in step 20, in order to deposit multiple layers of different mixtures 5 (containing different emissive materials 7) onto the substrate 3. The layers of different mixtures 5 can be layered on top of each other, or disposed next to each other, to provide additional markings for identification/ authentication.

FIG. 3 shows a data storage cartridge 25 to which the method described in the present invention is applicable. A thick layer of emissive material mixture 5 is applied either directly onto the cartridge housing or casing 27 or onto a sticker or other substrate that is to be affixed to the cartridge housing or casing 27.

In a preferred embodiment of the invention, a tag or marker containing the mixture 5 will be applied to the outer casing of the data storage cartridge. The tag will be used to emit irradiance, which will be read by a detector in the data storage drive in order to determine the presence of the correct data storage cartridge. An exemplary phosphor tag and method of detection and identification is described in co-pending application titled "Latent Illuminance Discrimination Marker For Data Storage Cartridges", Ser. No. 09/161,007, filed Sep. 25, 1998 commonly assigned, and incorporated herein by reference.

FIG. 4 shows a cross-sectional view of a substrate 3 to which the systems and methods described above are applicable. A thick layer of a mixture 5 comprising the emissive material 7 is disposed onto the substrate 3.

According to other aspects of the invention, a filter overcoat 30, preferably having a thickness between about 1 and 2 mils, is deposited over the mixture layer 5. Depending on the characteristics of the filter 30, it can be used to absorb unwanted light that is either irradiated onto the mixture layer 5 for charging the emissive material 7 contained therein, or can be used to filter unwanted light that is emitted from the emissive material 7 (e.g., light at an undesired wavelength). A preferred filter overcoat layer comprises ytterbium and screens out light irradiated onto the phosphor at a wavelength of about 950 nm.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A method of applying a luminescent emissive material to a substrate, comprising:

mixing said luminescent emissive material with a binder to form a mixture;

dispensing said mixture onto a mesh screen; and pushing said mixture through said mesh screen in a single pass thereby depositing a layer of said mixture onto said substrate, said layer having a thickness between about 8 and 12 mils.

2. The method of claim 1, wherein said luminescent emissive material comprises phosphor.

3. The method of claim 2, wherein said phosphor is an aggregate particle phosphor.

4. The method of claim 3, wherein said phosphor has a particle size of between about 0.5 and 6.0 mils.

5. The method of claim 1, wherein said binder is an ultra-violet curing carrier.

6. The method of claim 1, further comprising curing said mixture after depositing said layer of said mixture on said substrate.

7. The method of claim 1, further comprising depositing a filter overcoat layer on said layer of said mixture.

8. A method of applying a luminescent emissive material layer to a data storage cartridge, comprising:

mixing said luminescent emissive material with a binder to form a mixture;

continuously dispensing said mixture onto a mesh screen; and pushing said mixture through said mesh screen onto said data storage cartridge in a single pass, thereby depositing a layer of said mixture onto said data storage cartridge, said layer having a thickness between about 8 and 12 mils.

9. The method of claim 8, wherein said luminescent emissive material comprises phosphor.

10. The method of claim 9, wherein said phosphor is an aggregate particle phosphor.

11. The method of claim 10, wherein said phosphor has a particle size in the range of between about 0.5 and 6.0 mils.

12. The method of claim 8, wherein said binder is an ultra-violet curing carrier.

13. The method of claim 8, further comprising curing said mixture after depositing said layer on said data storage cartridge.

14. The method of claim 8, further comprising depositing a filter overcoat layer on said deposited layer of mixture.

* * * * *